US012613026B2

(12) United States Patent　　(10) Patent No.: US 12,613,026 B2

Limber　　(45) Date of Patent: Apr. 28, 2026

(54) SYSTEM AND METHOD FOR HANGING DECORATIVE ELEMENTS AT AN ELEVATED HEIGHT

(71) Applicant: Simple Living Solutions, LLC, Scottsdale, AZ (US)

(72) Inventor: Jamie Limber, Phoenix, AZ (US)

(73) Assignee: Simple Living Solutions, LLC, Scottsdale, AZ (US)

( * ) Notice: Subject to any disclaimer, the term of this patent is extended or adjusted under 35 U.S.C. 154(b) by 80 days.

(21) Appl. No.: 18/402,430

(22) Filed: Jan. 2, 2024

(65) Prior Publication Data

US 2024/0133545 A1　　Apr. 25, 2024

Related U.S. Application Data

(63) Continuation-in-part of application No. 29/474,912, filed on Mar. 16, 2015, now Pat. No. Des. 754,781.

(51) Int. Cl.
| | |
|---|---|
| *F21V 21/36* | (2006.01) |
| *F16B 2/22* | (2006.01) |
| *F21S 4/10* | (2016.01) |

(52) U.S. Cl.
CPC ............... *F21V 21/36* (2013.01); *F16B 2/22* (2013.01); *F21S 4/10* (2016.01)

(58) Field of Classification Search
CPC ............... F21V 21/36; F16B 2/22; F21S 4/10
See application file for complete search history.

(56) References Cited

U.S. PATENT DOCUMENTS

| | | | | |
|---|---|---|---|---|
| 5,607,230 | A * | 3/1997 | Protz, Jr. ............... | F21V 21/088 |
| | | | | 362/396 |
| 6,019,634 | A * | 2/2000 | Tseng ................... | F21V 19/0005 |
| | | | | 313/318.1 |
| 6,536,727 | B1 * | 3/2003 | Limber ................. | F21V 21/088 |
| | | | | 248/229.16 |
| 6,572,062 | B1 * | 6/2003 | Limber ................. | F21V 21/088 |
| | | | | 248/229.16 |
| D494,849 | S * | 8/2004 | Jones ............................ | D8/395 |
| 6,792,653 | B2 * | 9/2004 | Protz ..................... | A47G 33/10 |
| | | | | 24/669 |

(Continued)

FOREIGN PATENT DOCUMENTS

| | | | | |
|---|---|---|---|---|
| JP | 3163446 U | * 10/2010 | .............. | F16B 45/00 |

*Primary Examiner* — Kimberly T Wood
(74) *Attorney, Agent, or Firm* — Michelle L. Gross, P.C.

(57) ABSTRACT

An apparatus for hanging decorations comprising a first member comprising at least one notch, a neck proximal the at least one notch, and a clip coupled to the neck. The clip may comprise a first prong and a second dual-layer prong, the second dual-layer prong configured such that at least a portion of the first prong fits within the channel between the first and second layers of the second dual-layer prong and forms a substantially round structure configured to house a decoration therein. The apparatus further comprises a second member extending from the neck and forming an acute angle relative to the first member, the second member comprising at least one notch, an adapter handle coupled to the second member, the adapter handle positioned substantially parallel to the first member, and a hook comprising a notch, the hook coupled to the second member and the adapter handle.

20 Claims, 9 Drawing Sheets

(56) References Cited

U.S. PATENT DOCUMENTS

| | | | | |
|---|---|---|---|---|
| 6,827,379 B2 * | 12/2004 | Hill | ....................... | A47F 5/0892 |
| | | | | 248/205.3 |
| D856,791 S * | 8/2019 | Limber | ......................... | D8/395 |
| D1,009,607 S * | 1/2024 | Limber | ......................... | D8/356 |
| 2013/0148366 A1 * | 6/2013 | Adams, IV | ........... | F21V 21/088 |
| | | | | 362/396 |
| 2018/0017240 A1 * | 1/2018 | Schreiber | .................. | F21S 4/10 |
| 2021/0102687 A1 * | 4/2021 | Brettmann-Skogg | ..... | F21S 4/10 |

* cited by examiner

SYSTEM AND METHOD FOR HANGING DECORATIVE ELEMENTS AT AN ELEVATED HEIGHT

CROSS REFERENCE TO RELATED APPLICATIONS

This application is a continuation in part of and claims priority to U.S. application Ser. No. 29/747,912 entitled "Clip for Coupling to an Extension Pole for Setting Decorative Elements at an Elevated Height" to Jamie Limber, filed on Aug. 26, 2020.

BACKGROUND

1. Field of the Invention

The field of the present invention generally relates to temporarily securing, placing, and installing decorations on a variety of surfaces at an elevated height.

2. Description of Related Art

Many methods for hanging lights and other decorations require placing items in high, elevated, and/or out of reach areas such as gutters, shingles, roof eaves, fascia boards, second story locations, tree branches, etc. For many households, decorating for holidays and other festive events requires extensive time and effort with a ladder, step-stool or other device to allow an individual to climb to a higher position to install lights and/or decorations at an elevated location. Frequently, this results in the decorator climbing beyond a safe position, such as above the safety run of a ladder or to reach and stretch to a position that may dangerously cause the decorator to lean too far to one side resulting in a loss of balance and/or a fall that can cause injury. Such safety risks may be further exacerbated during inclement weather or in wet, cold, icy, or snowy climate conditions.

SUMMARY

Implementations of an apparatus for hanging decorations may comprise a first member comprising at least one notch, a neck proximal the at least one notch, and a clip coupled to the neck. The clip may comprise a first prong and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure configured to house a decoration therein. The apparatus may further comprise a second member extending from the neck and forming an acute angle relative to the first member, the second member comprising at least one notch, an adapter handle coupled to the second member, the adapter handle positioned substantially parallel to the first member, and a hook coupled to the second member and the adapter handle, the hook comprising at least one notch therein.

Particular aspects may comprise one or more of the following features. The first prong may further comprise a nub at a point distal from the neck, the nub configured to fit within the channel between the first and second layers of the second dual-layer prong, such that when the first prong is fitted within channel of the second dual-layer prong, the nub prevents the first prong from freely sliding back to its original position. The apparatus may further comprise a support member coupled to the second member, the support member positioned substantially parallel to the adapter handle. The support member may be located proximal the at least one notch in the second member. The first prong may comprise a first curved segment and a second curved segment, the second curved segment being substantially wider than the first curved segment and the second dual-layer prong may comprise a third curved segment and a fourth curved segment, the fourth curved segment being substantially wider than the third curved segment, and configured such that when the first prong is fitted within the channel of the second dual-layer prong, the clip forms two substantially circular gaps of different radii.

Implementations of a method of hanging decorations using an apparatus for hanging decorations may comprise coupling an adapter handle of the apparatus to an adapter affixed to a pole, the adapter handle positioned substantially parallel to a first member of the apparatus, the first member comprising at least one notch, wherein the apparatus further comprises a neck proximal the at least one notch and a clip coupled to the neck. The clip may comprise a first prong and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure configured to house a decoration therein. The apparatus may further comprise a second member extending from the neck and forming an acute angle relative to the first member, the second member comprising at least one notch and a hook coupled to the second member and the adapter handle, the hook comprising at least one notch therein. The method may further comprise placing a first decoration within at least one of the at least one notch of the second member and the at least one notch of the hook and coupling the apparatus to a structure such that the decoration is displayed.

Particular aspects may comprise one or more of the following features. The structure to which the apparatus is coupled may be a gutter and the first member of the apparatus and the hook may be in contact with the gutter. The structure to which the apparatus is coupled may be a roofing shingle and the first member of the apparatus and the hook may be in contact with the roofing shingle. The first decoration placed within the at least one of the at least one notch of the second member and the at least one notch of the hook may be a string of lights. The method may further comprise securing a second decoration within the clip of the apparatus by positioning a nub located at a point distal from the neck within the channel between the first and second layers of the second dual-layer prong such that when the first prong is fitted within the channel of the second dual-layer prong, the nub prevents the first prong from freely sliding back to its original position. The apparatus may further comprise a support member coupled to the second member, the support member positioned substantially parallel to the adapter handle. The support member may be located proximal the at least one notch in the second member. The first prong may comprise a first curved segment and a second curved segment, the second curved segment being substantially wider than the first curved segment and the second dual-layer prong may comprise a third curved segment and a fourth curved segment, the fourth curved segment being substantially wider than the third curved segment, and configured such that when the first prong is fitted within the channel of the second dual-layer prong, the clip forms two substantially circular gaps of different radii.

Implementations of a method of making an apparatus for hanging decorations may comprise providing a first member comprising at least one notch, coupling a neck to the first member proximal the at least one notch, and coupling a clip to the neck. The clip may comprise a first prong and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure configured to house a decoration therein. The method may further comprise coupling a second member to the neck such that the second member extends from the neck and forms an acute angle relative to the first member, the second member comprising at least one notch. The method may further comprise coupling an adapter handle to the second member and positioning the adapter handle substantially parallel to the first member and coupling a hook to the second member and the adapter handle, the hook comprising at least one notch therein.

Particular aspects may comprise one or more of the following features. The method may further comprise forming a nub on the first prong at a point distal from the neck, the nub configured to fit within the channel between the first and second layers of the second dual-layer prong, such that when the first prong is fitted within channel of the second dual-layer prong, the nub prevents the first prong from freely sliding back to its original position. The method may further comprise coupling a support member to the second member, the support member positioned substantially parallel to the adapter handle. The support member may be located proximal the at least one notch in the second member. The first prong may comprise a first curved segment and a second curved segment, the second curved segment being substantially wider than the first curved segment and the second dual-layer prong may comprise a third curved segment and a fourth curved segment, the fourth curved segment being substantially wider than the third curved segment, and configured such that when the first prong is fitted within the channel of the second dual-layer prong, the clip forms two substantially circular gaps of different radii. At least one of the at least one notch of the second member and the at least one notch of the hook may be configured to hold a string of lights therein. The adapter handle may be configured to fit within an adapter coupled to a pole.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112 (f). Thus, the use of the words "function," "means" or "step" in the Detailed Description or Description of the Drawings or Claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112 (f). Moreover, even if the provisions of 35 U.S.C. § 112 (f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION, DRAWINGS, and CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Figure 1:
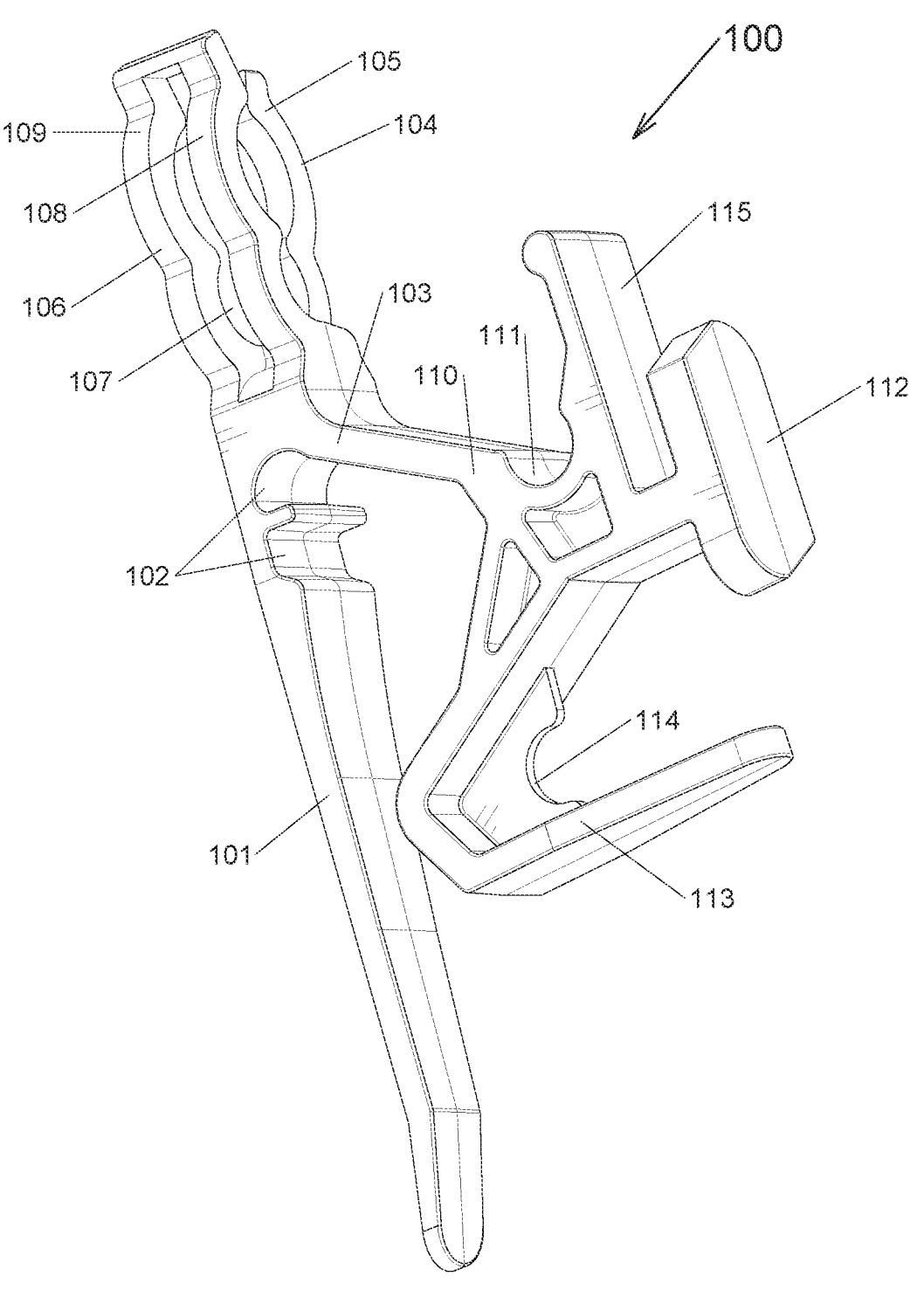
FIG. 1 representatively illustrates a perspective view of an embodiment of an apparatus for hanging decorative elements at an elevated height.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

The present disclosure relates to systems and methods for securing decorations to various surfaces and positions via an apparatus 100 that is configured to couple to various forms of adapters 600 that couple to a pole 601 so as to allow a user to secure decorative elements such as, but not limited to, lights, garlands, streamers, banners, flags, etc., to difficult to reach structures that may be at an elevated height relative to the user's natural range of reach. Referring now to FIGS. 1-5, an exemplary embodiment of an apparatus 100 for hanging a decorative element at an elevated position is shown. In many embodiments the device 100 is comprised of a first member 101 which may have an elongated shape. The first member 101 may comprise one or more notches 102 on a first surface of the first member 101 positioned proximal to a neck 103 that is coupled to the first member 101. A clip 104 may be coupled to the neck 103 on a side of the neck 103 opposite the first member 101. In some embodiments, the clip 104 may further comprise a first prong 105 and a second prong 106. In some exemplary embodiments, as shown, the second prong 106 may be a dual-layer prong comprising a first layer 108 and a second layer 109 with a channel 107 between the first 108 and second 109 layers. In some embodiments the clip 104 is constructed of manually deformable plastics, such that a user could press the first prong 105 and second prong 106 towards each other such that at least a portion of the first prong 105 seats withing the channel 107 between the first 108 and second 109 layers of the second prong 106, resulting in the clip 104 tightening to secure a decoration or other object of an appropriate size.

In some embodiments, the apparatus 100 further comprises a second member 110 coupled to the neck 103 and extending from the neck 103 such that the second member 110 forms an acute angle relative to the first member 101. The second member 110 may comprise at least one notch 111 distal the neck 103 in which to house and secure a string of lights or other decorative element therein. The second member 110 may be coupled to a hook 113 comprising at least one notch 114 within the generally concave portion of the hook 113 and configured such that the generally convex surface of the hook 113 is proximal the first member 101. Some embodiments of the apparatus 100 may further comprise at least one of an adapter handle 112 and a support member 115 coupled between the second member 110 and the hook 113. At least one of the adapter handle 112 and the support member 115 may be positioned substantially parallel to a plane in which the first 105 or second prongs 106 of the clip 104 lies or to a plane in which the first member 101 lies.

Figure 2:
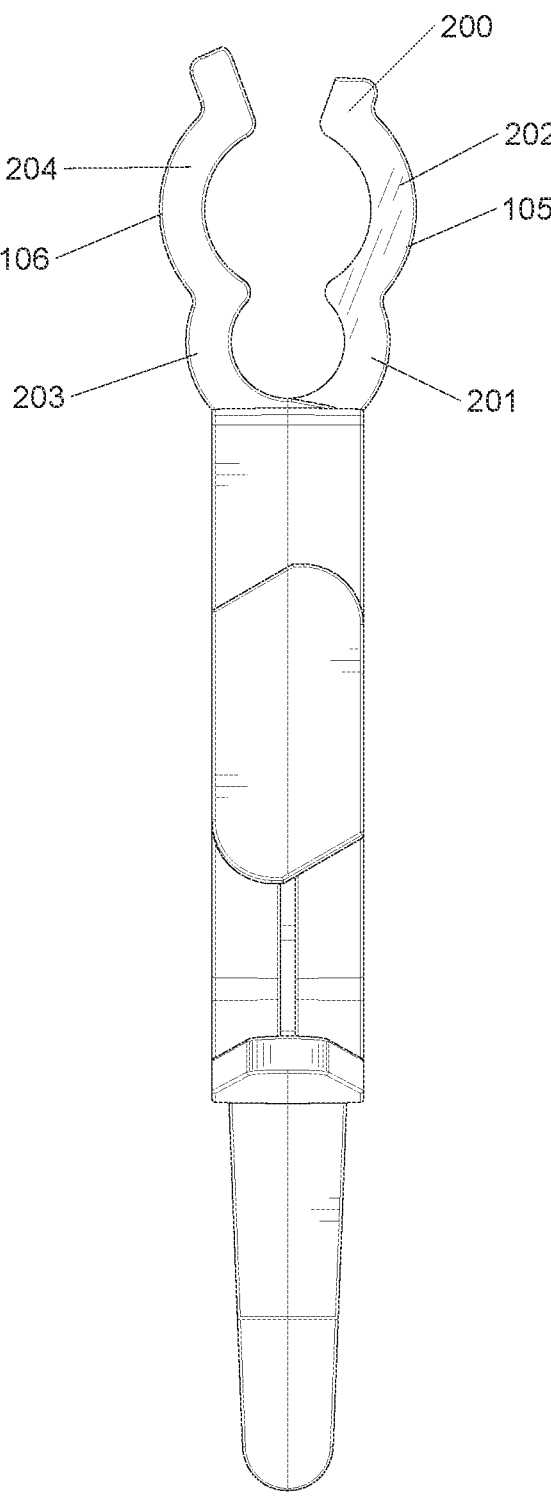
FIGS. 2-5 representatively illustrate top, bottom and side views of the apparatus of FIG. 1.
Figure 3:
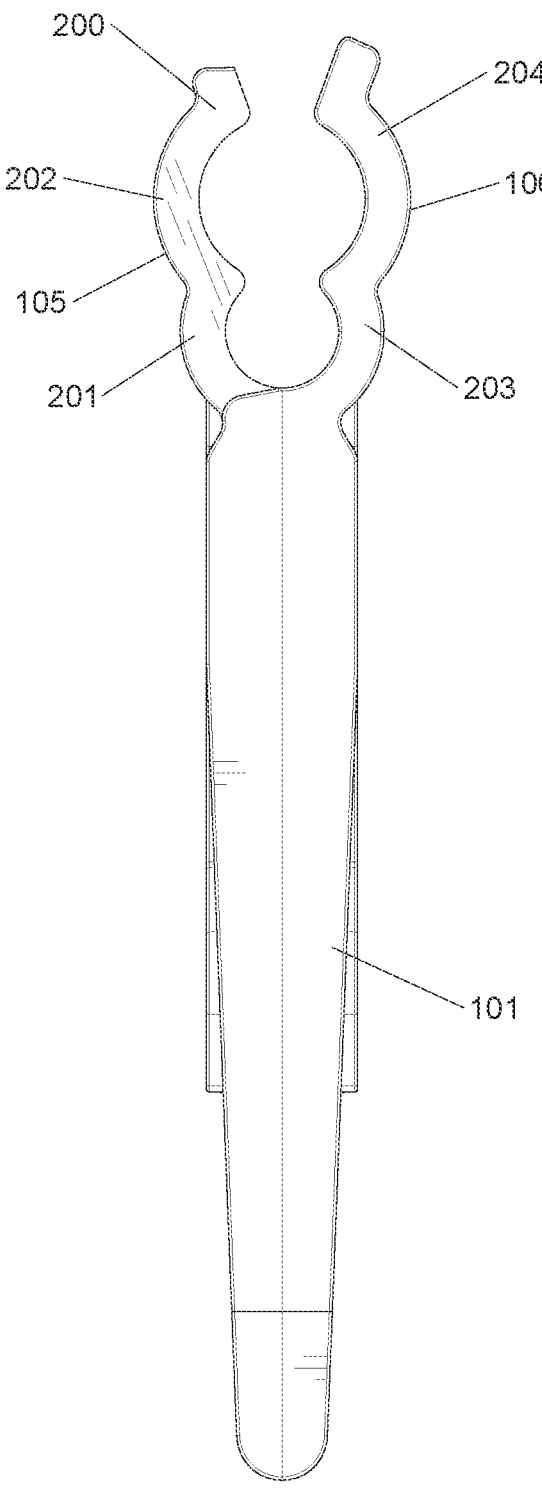
Figure 4:
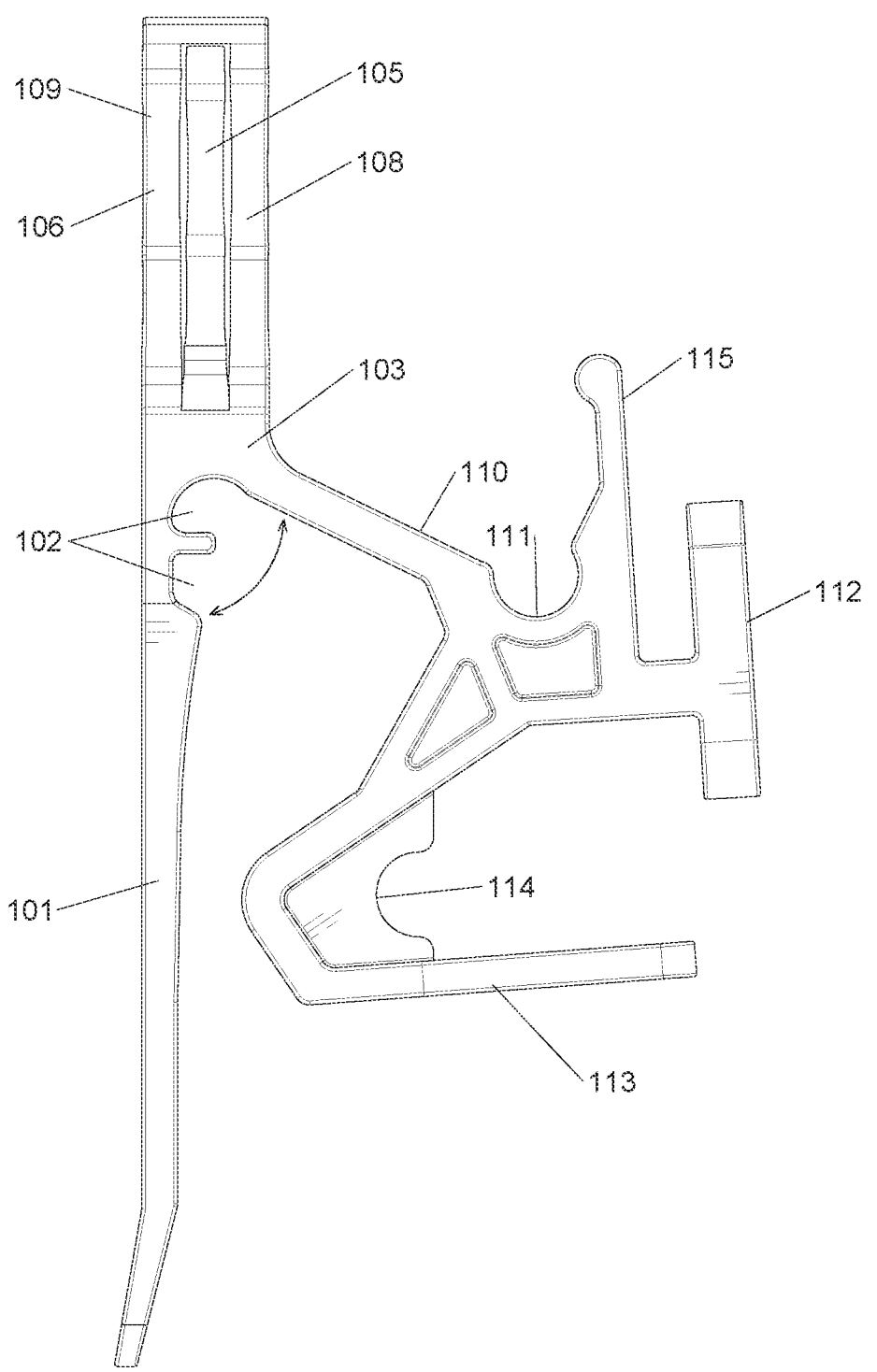
Figure 5:
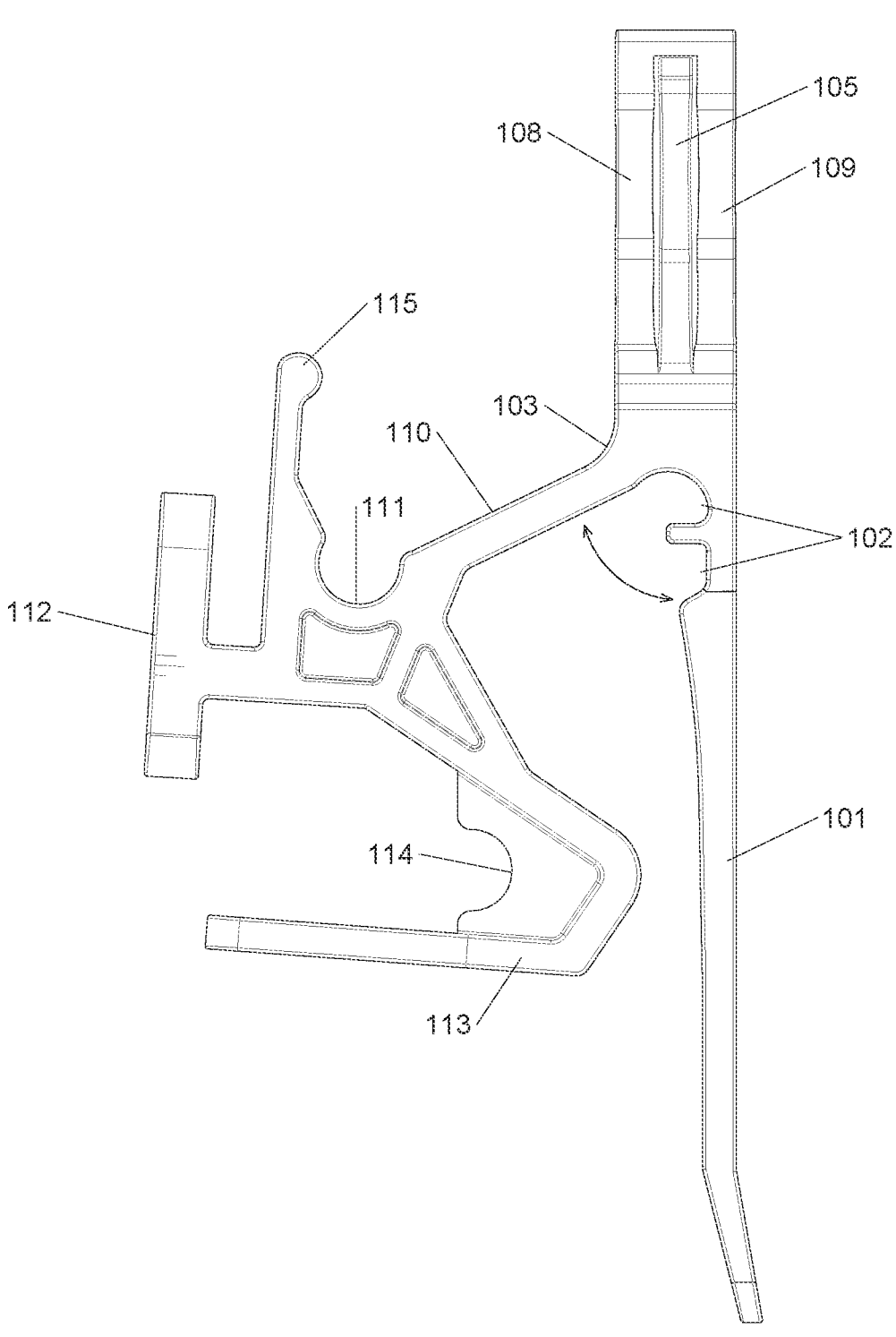

Referring now to FIGS. 2-3, top and bottom views of the apparatus 100 are shown. In many embodiments, the first prong 105 further comprises a first curved segment 201 and a second curved segment 202, and the second prong 106 further comprises a third curved segment 203 and fourth curved segment 204. In these and other embodiments a nub 200 may also be present on the first prong 105. When the first prong 105 and second prong 106 are tightened, the first curved segment 201 and third curved segment 203 may form a round structure with a smaller radius configured to hold a decoration, and the second curved segment 202 and the fourth curved segment 204 form a second, round structure with a larger radius configured to hold a decoration. In some embodiments, when the first prong 105 and second prong 106 are pressed together to tighten the clip 104, the nub 200 may slide through the second prong 106 and act to lock the first prong 105 and second prong 106 together.

Figure 6:
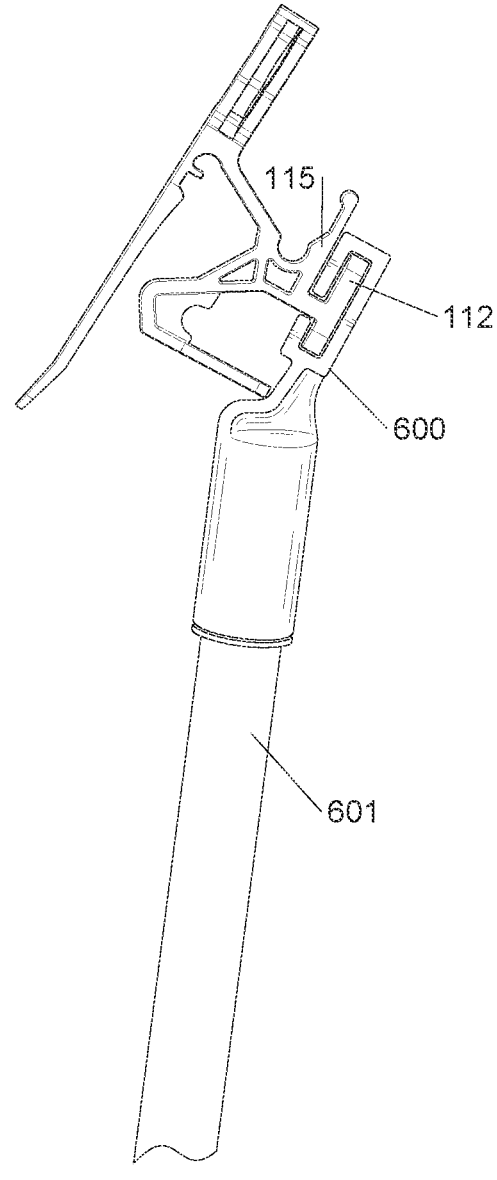
FIG. 6 shows the apparatus of FIGS. 1-5 coupled to an adapter on a pole for securing the apparatus to a gutter.
Figure 7:
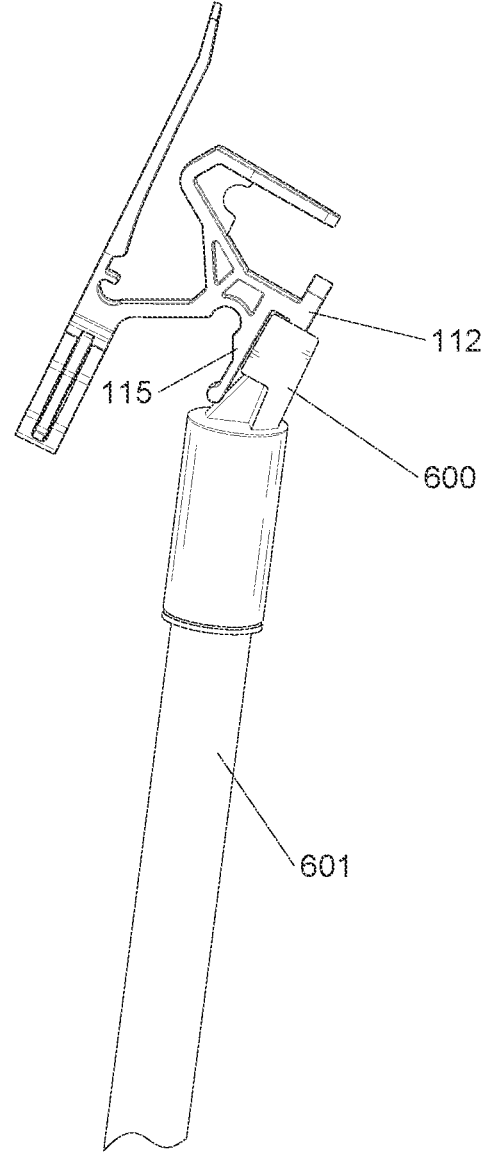
FIG. 7 shows the apparatus of FIGS. 1-5 coupled to an adapter on a pole for securing the apparatus to a roofing shingle.
Figure 8:
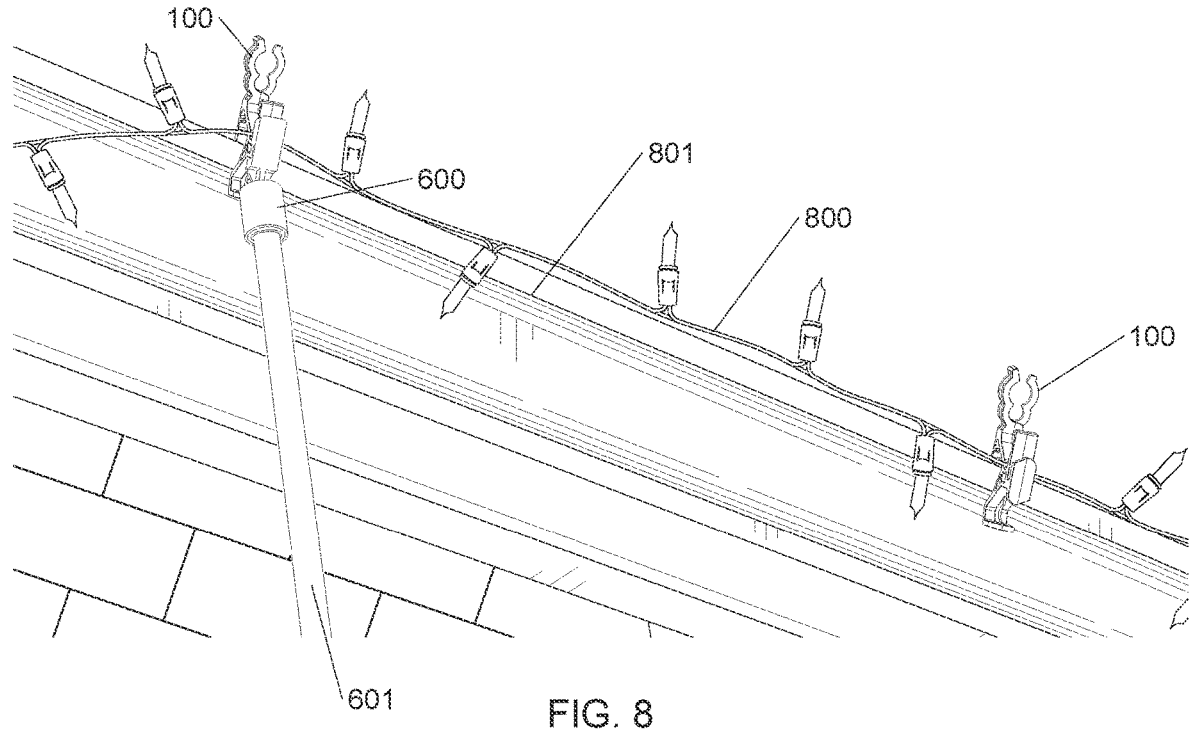
FIGS. 8-9 depict the apparatus in use to secure a string of lights to a gutter and roofing shingles, respectively.
Figure 9:
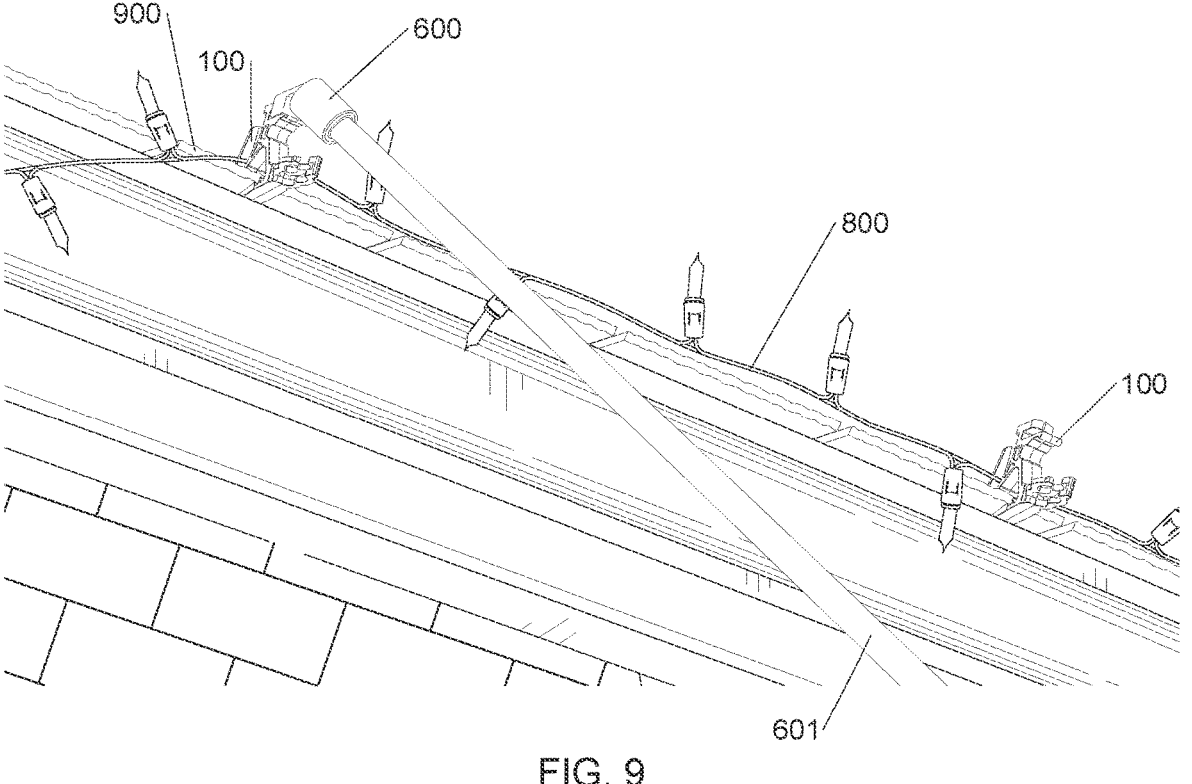

Referring now to FIGS. 6-7, the apparatus 100 for securing decorative elements at elevated heights is shown coupled to various adapters 600 that are coupled to a pole 601 to allow the user to secure the apparatus 100 to a surface that would ordinarily be difficult to reach. Depending upon the user's choice of which shape of adapter 600 to use, the apparatus can be secured within the adapter 600 at a variety of angles which allows for ease of use depending on the type of surface or structure the user intends to decorate. For example, by placing the adapter handle 112 securely within the opening of the adapter 600 in the manner depicted in FIG. 6, the orientation of the apparatus 100 within the adapter allows a user to easily string and secure a string of lights 800 to a gutter 801 as shown in FIG. 8 by placing the string of lights 800 within the notch 111 of the second member and sliding the apparatus 100 downward onto the edge of the gutter 801 such that the first member 101 and the generally convex surface of the hook 113 are securely in contact with the gutter 801. Another non-limiting example of the orientation of the apparatus 100 relative to the adapter 600 and pole 601 is provided in FIG. 7 which allows the first member 101 of the apparatus 100 to be easily inserted underneath a roofing shingle 900 such that the first member 101 and the convex surface of the hook 113 are in contact with the roofing shingle 900 to securely hold the apparatus 100 in place. While the depicted examples of use of the apparatus 100 show the device in use holding a string of lights 800, it should be readily appreciated that such uses are not limited to holding lights and may be used to secure garlands, streamers, banners, flags, or any other decorative elements by securing such decorative elements within one or more of the notches, hooks, or clips of the apparatus 100. In some embodiments, it may be preferable to construct the apparatus 100 of one or more manually deformable plastics to allow for appropriate flexion of the first member relative to the hook when securing the apparatus to an elevated structure.

In places where the description above refers to particular embodiments of systems and methods for a device for hanging decorative elements at an elevated height, it should be readily apparent that a number of modifications may be made without departing from the spirit thereof and that these embodiments may be applied to other systems and methods for a hanging decorations at elevation.

I claim:

1. An apparatus for hanging decorations, the apparatus comprising:
   a first member comprising at least one first member notch;
   a neck proximal the at least one first member notch;
   a clip coupled to the neck and comprising:
      a first prong; and
         a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure configured to house at least one of the decorations therein;

a second member extending from the neck and forming an acute angle relative to the first member, the second member comprising at least one second member notch;

an adapter handle coupled to the second member, the adapter handle positioned substantially parallel to the first member; and a hook coupled to the second member and the adapter handle, the hook comprising at least one hook notch therein.

2. The apparatus of claim 1, wherein the first prong further comprises a nub at a point distal from the neck, the nub configured to fit within the channel between the first and second layers of the second dual-layer prong, such that when the first prong is fitted within the channel of the second dual-layer prong, the nub prevents the first prong from freely sliding back to an original position of the first prong.

3. The apparatus of claim 1, further comprising a support member coupled to the second member, the support member positioned substantially parallel to the adapter handle.

4. The apparatus of claim 3, wherein the support member is located proximal the at least one second member notch in the second member.

5. The apparatus of claim 1, wherein:

the first prong comprises a first curved segment and a second curved segment, the second curved segment being substantially wider than the first curved segment; and the second dual-layer prong comprises a third curved segment and a fourth curved segment, the fourth curved segment being substantially wider than the third curved segment, and configured such that when the first prong is fitted within the channel of the second dual-layer prong, the clip forms two substantially circular gaps of different radii.

6. A method of hanging decorations using an apparatus for hanging decorations, the method comprising:

coupling an adapter handle of the apparatus to an adapter affixed to a pole, the adapter handle positioned substantially parallel to a first member of the apparatus, the first member comprising at least one first member notch, wherein the apparatus further comprises:

a neck proximal the at least one first member notch;

a clip coupled to the neck and comprising:

a first prong; and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure configured to house at least one of the decorations therein;

a second member extending from the neck and forming an acute angle relative to the first member, the second member comprising at least one second member notch; and a hook coupled to the second member and the adapter handle, the hook comprising at least one hook notch therein;

placing a first decoration within at least one of the at least one second member notch of the second member and the at least one hook notch of the hook; and coupling the apparatus to a structure such that the at least one of the decorations is displayed.

7. The method of claim 6, wherein the structure to which the apparatus is coupled is a gutter and the first member of the apparatus and the hook are in contact with the gutter.

8. The method of claim 6, wherein the structure to which the apparatus is coupled is a roofing shingle and the first member of the apparatus and the hook are in contact with the roofing shingle.

9. The method of claim 6, wherein the first decoration placed within the at least one of the at least one second member notch of the second member and the at least one hook notch of the hook is a string of lights.

10. The method of claim 6, further comprising securing a second decoration within the clip of the apparatus by positioning a nub located at a point distal from the neck within the channel between the first and second layers of the second dual-layer prong such that when the first prong is fitted within the channel of the second dual-layer prong, the nub prevents the first prong from freely sliding back to an original position of the first prong.

11. The method of claim 6, wherein the apparatus further comprises a support member coupled to the second member, the support member positioned substantially parallel to the adapter handle.

12. The method of claim 11, wherein the support member is located proximal the at least one notch in the second member.

13. The method of claim 6, wherein:

the first prong comprises a first curved segment and a second curved segment, the second curved segment being substantially wider than the first curved segment; and the second dual-layer prong comprises a third curved segment and a fourth curved segment, the fourth curved segment being substantially wider than the third curved segment, and configured such that when the first prong is fitted within the channel of the second dual-layer prong, the clip forms two substantially circular gaps of different radii.

14. A method of making an apparatus for hanging decorations, the method comprising:

providing a first member comprising at least one first member notch;

coupling a neck to the first member proximal the at least one first member notch;

coupling a clip to the neck, the clip comprising:

a first prong; and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure configured to house at least one of the decorations therein;

coupling a second member to the neck such that the second member extends from the neck and forms an acute angle relative to the first member, the second member comprising at least one second member notch;

coupling an adapter handle to the second member and positioning the adapter handle substantially parallel to the first member; and coupling a hook to the second member and the adapter handle, the hook comprising at least one hook notch therein.

15. The method of claim 14, further comprising forming a nub on the first prong at a point distal from the neck, the nub configured to fit within the channel between the first and second layers of the second dual-layer prong, such that when the first prong is fitted within channel of the second dual-layer prong, the nub prevents the first prong from freely sliding back to an original position of the first prong.

16. The method of claim 14, further comprising coupling a support member to the second member, the support member positioned substantially parallel to the adapter handle.

17. The method of claim 16, wherein the support member is located proximal the at least one second notch in the second member.

18. The method of claim 14, wherein:

the first prong comprises a first curved segment and a second curved segment, the second curved segment being substantially wider than the first curved segment; and the second dual-layer prong comprises a third curved segment and a fourth curved segment, the fourth curved segment being substantially wider than the third curved segment, and configured such that when the first prong is fitted within the channel of the second dual-layer prong, the clip forms two substantially circular gaps of different radii.

19. The method of claim 14, wherein at least one of the at least one second member notch of the second member and the at least one notch of the hook is configured to hold a string of lights therein.

20. The method of claim 14, wherein the adapter handle is configured to fit within an adapter coupled to a pole.

* * * * *